United States Patent [19]

Skinner

[11] Patent Number: 4,683,963

[45] Date of Patent: Aug. 4, 1987

[54] DRILLING CUTTINGS TREATMENT

[75] Inventor: James L. Skinner, Plano, Tex.

[73] Assignee: Atlantic Richfield Company, Los Angeles, Calif.

[21] Appl. No.: 727,311

[22] Filed: Apr. 25, 1985

[51] Int. Cl.⁴ .......................... E21B 21/06; C09K 7/00
[52] U.S. Cl. ....................................... 175/66; 175/206; 175/207; 203/14; 202/185.2; 210/180
[58] Field of Search .......................... 175/66, 206–208; 134/109; 210/180, 770, 803, 265, 805; 201/29; 203/14; 202/155.2

[56] References Cited

U.S. PATENT DOCUMENTS

| | | | |
|---|---|---|---|
| 4,139,462 | 2/1979 | Sample, Jr. | 175/66 |
| 4,154,584 | 5/1979 | Ullrich | 201/29 |
| 4,208,285 | 6/1980 | Sample, Jr. | 175/206 |
| 4,209,381 | 6/1980 | Kelly, Jr. | 175/66 |
| 4,222,988 | 9/1980 | Barthel | 175/66 |
| 4,225,415 | 9/1980 | Mirza et al. | 201/29 |
| 4,319,410 | 3/1982 | Heilhecker et al. | 175/207 |
| 4,387,514 | 6/1983 | McCaskill, Jr. | 175/206 |
| 4,396,508 | 8/1983 | Broughton | 210/802 |

Primary Examiner—Stephen J. Novosad
Assistant Examiner—Bruce M. Kisliuk
Attorney, Agent, or Firm—Roderick W. MacDonald; Michael E. Martin

[57] ABSTRACT

A method and apparatus for drilling a wellbore in the earth from a location in a body of water wherein the drilling operation generates a substantial amount of a mixture of solid drilling cuttings, water and at least one hydrocarbonaceous oil wherein the water and oil are removed from the solid drilling cuttings and any retain solid particles in said water and oil are removed therefrom prior to reuse, disposal, or other disposition of said water and oil.

8 Claims, 5 Drawing Figures

DRILLING CUTTINGS TREATMENT

BACKGROUND OF THE INVENTION

When drilling a wellbore in the earth, solid particles such as rock cuttings formed by the drilling bit action are recovered at the drilling rig and have to be disposed of in an acceptable manner. The disposal of drilling cuttings from offshore wells which are located in a body of water is particularly important because of the hauling distances involved if the cuttings cannot be disposed of in the water surrounding the offshore drilling rig.

If the drilling cuttings recovered at the working floor of the drilling rig are contaminated with one or more hydrocarbonaceous oils for any number of reasons, for example, an oil based drilling mud was used in the drilling operation or oil was employed in a water-based drilling mud to improve lubricity of the drillstring and bit in the wellbore, or the like, the cuttings disposal problem is sensitive from an environmental point of view as well as other obvious points of view.

BRIEF SUMMARY OF THE INVENTION

In accordance with this invention, there is provided a method and apparatus for removing hydrocarbonaceous oil from drilling cuttings so that the solid drilling cuttings themselves can be disposed of offshore in an environmentally acceptable manner.

Accordingly, it is an object of this invention to provide a new and improved method and apparatus for treating drilling cuttings for disposal purposes.

It is another object of this invention to provide a new and improved method for rendering drilling cuttings environmentally acceptable for subsequent offshore disposal.

Other aspects, objects and advantages of this invention will be apparent to those skilled in the art from this disclosure and the appended claims.

DETAILED DESCRIPTION OF THE INVENTION

Figure 1:
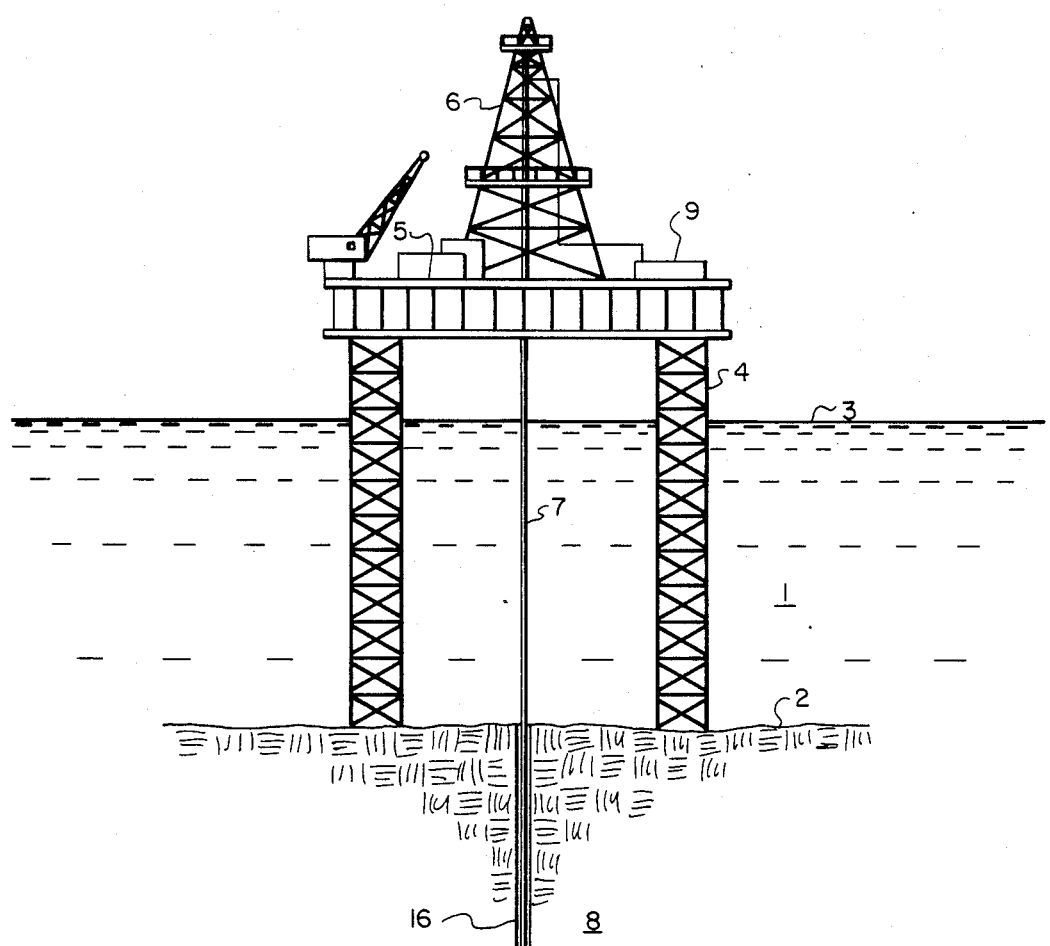
FIG. 1 shows an offshore drilling rig in a body of water.

FIG. 1 shows a body of water 1 underlayed by earth's surface 2 and having a water surface 3. A standard ocean floor supported drilling platform 4 is placed at a location in water body 1. The working floor 5 of platform 4 carries a drilling rig 6 which operates a drillstring 7 downwardly therefrom to ocean floor 2 to drill wellbore 16 in the earth 8. Various ancillary pieces of equipment (not shown) are supported on working floor 5 around rig 6 in addition to apparatus 9 which is the apparatus used in the practice of this invention.

Figure 2:
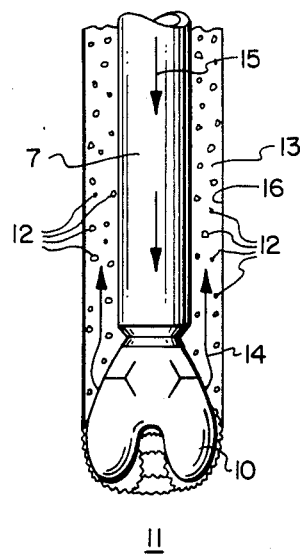
FIG. 2 shows a cross section of a portion of a drillstring and a drillbit working in a wellbore.

FIG. 2 shows the lower end of wellbore 16 with a lower portion of drillstring 7 therein and drillbit 10 carried at the bottom of drillstring 7. In the conventional drilling situation, drillstring 7 is rotated which in turn rotates bit 10, and bit 10 chews up the rock 11 underlying bit 10 to create a large amount of solid particles called drill cuttings 12. Cuttings 12 are washed upwardly in annulus 13 of wellbore 16 by drilling fluid 14 which is pumped down the interior of drillstring 7 as shown by arrow 15 outwardly through and/or around drillbit 10 and then upwardly in annulus 13. Drilling fluid 14 thereby washes solid particulate drilling cuttings 12 away from the bottom of wellbore 16 upwardly in annulus 13 back to working floor 5 of platform 4 at which point cuttings 12 have to be disposed of in some manner.

If cuttings 12 are contaminated with one or more hydrocarbonaceous oils or similar material, the cuttings cannot be disposed of by simply dispersing same in water body 1.

In accordance with this invention, the contaminated drilling cuttings are treated in apparatus 9 before subsequent disposition. Apparatus 9 can take many forms so long as it carries out the method of this invention. That method is to recover the mixture of drilling cuttings, water, and hydrocarbonaceous oil or oils at or above the surface 3 of water body 1 and then heating this mixture to a first elevated temperature sufficient to vaporize essentially all of the water and a small amount of the oil therefrom to produce a mixture of heated cuttings and liquid oil and a separate mixture of vaporized water and oil. The mixture of vaporized water and oil is recovered separately and the mixture of heated cuttings and liquid oil is subjected to a second elevated temperature which is substantially higher than the first elevated temperature and sufficient to vaporize essentially all of the oil remaining with the cuttings, thereby to produce a dry, oil-free cuttings product and a separate vaporized oil fraction. The vaporized oil fraction is recovered separately from the cuttings whereby the cuttings are now in a condition acceptable for disposal in the body of water or elsewhere as desired.

The type of hydrocarbonaceous oil or oils associated with the cuttings can vary widely but in normal drilling practice will generally have a boiling range of from about 300° to about 700° F. In such a situation, the first elevated temperature will be in the range of from about 212° to about 240° F. while the second elevated temperature will be in the range of from about 300° to about 725° F. The mixture being treated in accordance with the method of this invention is held at the designated temperature of temperatures for a time sufficient to achieve the desired result of either vaporizing all associated water and a small amount of associated oil, or vaporizing all of the remaining oil, all as described hereinabove.

The separately recovered vaporized mixture of water and oil is essentially liquefied and the liquefied water is separated from the liquefied oil so that both liquids can be recovered separately from one another for reuse or disposition as desired.

The second heating step for vaporizing essentially all the remaining oil associated with the cuttings can be carried out under autogenous pressure or, if desired, a vacuum can be employed so that the second heating step is carried out under at least a partial vacuum thereby achieving a more thorough removal of oil from the solid cuttings.

Figure 3:
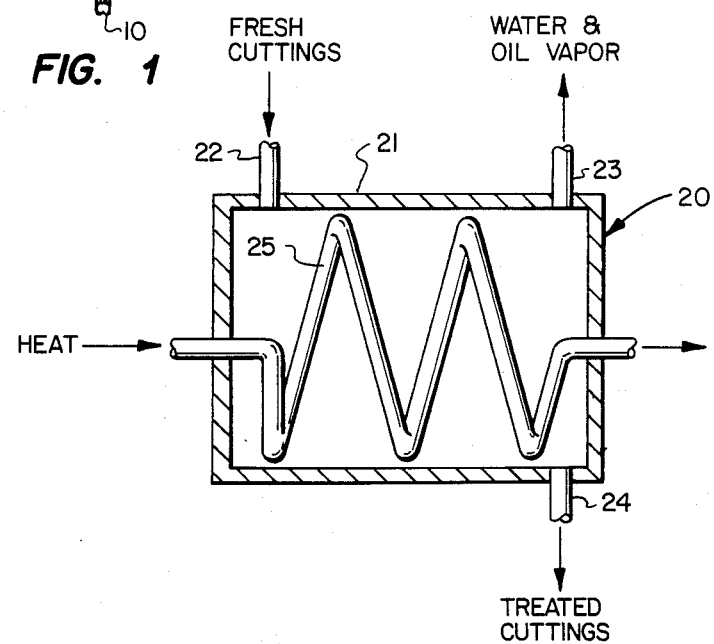
FIG. 3 shows apparatus useful in this invention.

FIG. 3 shows a dryer 20 useful in this invention which is an indirect heat exchange means comprising a closed chamber 21, except for inlet conduit 22 and outlet conduits 23 and 24, and a heat conducting coiled or otherwise convoluted interior tube 25. This way, fresh drilling cuttings to be treated in accordance with this invention are passed into the interior of chamber 21 by way of inlet conduit 22 and in chamber 21 come into indirect heat exchange contact with tube 25 which is carrying interiorly thereof a heating medium such as hot oil or hot water. As the cuttings work towards outlet conduit 24, the temperature of the cuttings and associated oil and water are raised to the point where all or essentially all of the water and/or oil is vaporized. The vaporized oil and/or water is removed by way of conduit 23 while the thus treated cuttings are removed by way of conduit 24.

Dryer 20 can be made of a sufficient size that essentially dry, oil-free cuttings are removed by way of conduit 24 or two or more separate dryer units 20 can be employed in series. For example, when a series of two dryers 20 are employed serially in the practice of this invention, the first chamber through which the cuttings pass will remove essentially only water vapor and perhaps a small amount of oil vapor and the cuttings flowing through the outlet conduit 24 from the first dryer will then pass into a second dryer of essentially the same construction as that shown in FIG. 3 such as by way of inlet conduit 22 to be heated further to a higher temperature to remove essentially all of the oil (as a vapor) which was left with the cuttings when the cuttings were removed from the first dryer. Such a process and apparatus is fully and completely disclosed in Applicant's co-pending U.S. patent application Ser. No. 06/677,658 filed Dec. 3, 1984, and of common Assignee. The oil and water vapor recovered from one or more dryers 20 by way of their outlet conduits 23 can sometimes contain retained solid fines from the treated cuttings and it is desirable, in order to minimize the potential for plugging, to minimize this solids carryover with the oil and water vapors from the dryer or dryers 20. Typically, from about 1 to about 3 weight percent based on the total weight of fresh cuttings fed to the dryer or dryers employed in the practice of this invention can at times be retained and carried over by the water and oil vapors removed from those dryers.

Figure 4:
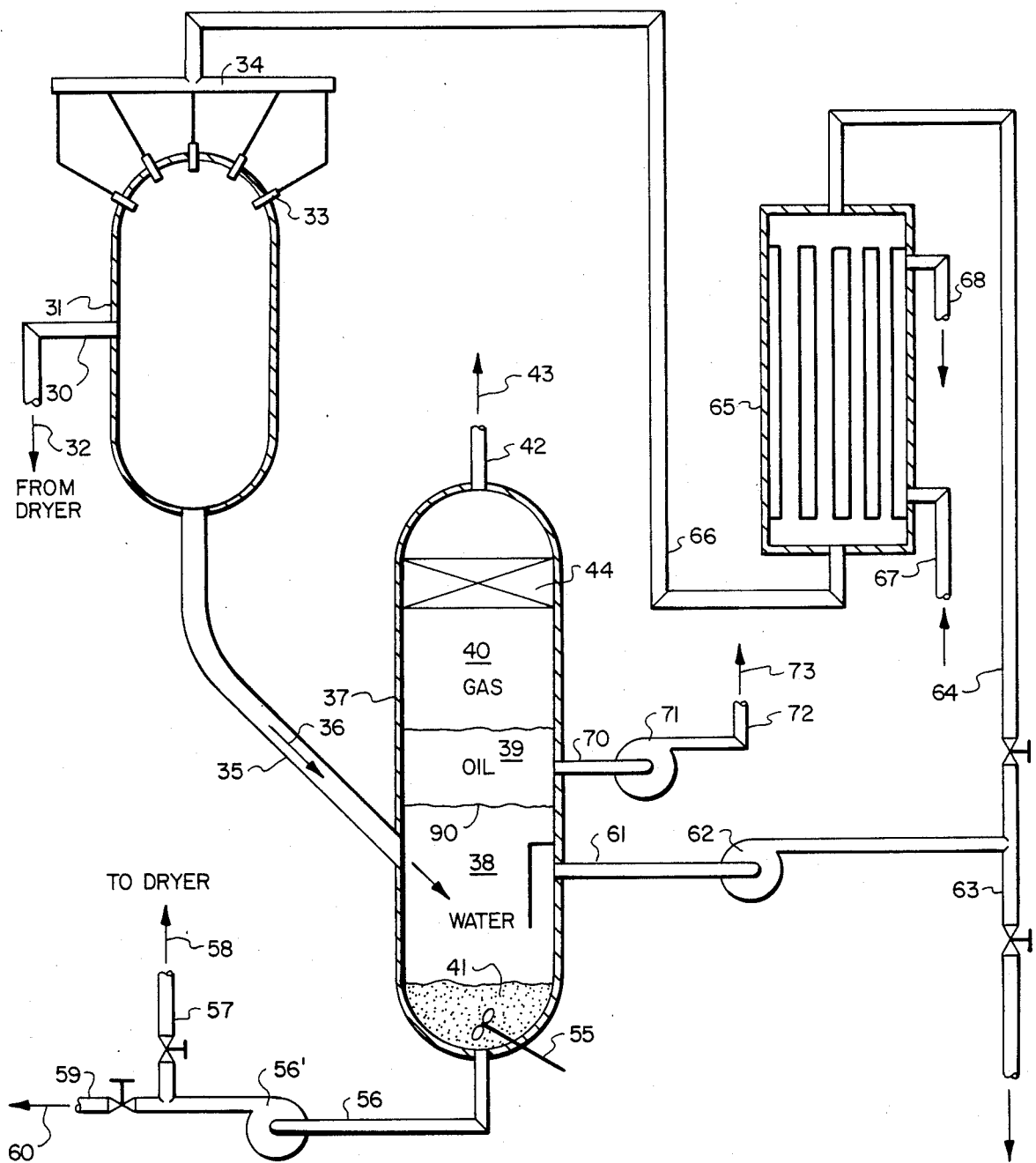
FIG. 4 shows apparatus useful in this invention wherein a spray chamber is used as a condensing means.

FIG. 4 shows one embodiment within this invention for further treating the water oil vapors recovered from the dryers which retain small amounts of solid fines obtained from the fresh cuttings processed in the dryers. The vaporized water and oil and retained solid fines as removed, for example, from outlet conduit 23 of dryer 20 of FIG. 3 passes through pipe 30 of FIG. 4 into chamber 31 as shown by arrow 32 for mixing in chamber 31 with a cooling liquid. The cooling liquid is supplied in a volume and at a temperature such that essentially all of the vaporous oil and water supplied by way of pipe 30 is condensed to the liquid state without vaporizing any significant amount of the cooling liquid itself. In the embodiment of FIG. 4, a spray chamber is employed wherein a plurality of sprays 33 spray the finely divided streams of the cooling liquid received from manifold 34 into the stream of vaporized oil and water and retained solid fines.

The resulting liquid mixture of essentially cooling liquid, water, oil, and retained solid fines is removed from the bottom of chamber 31 through pipe 35 as shown by arrow 36 into separator means 37 wherein the liquid mixture is allowed to remain under essentially quiescent conditions until the oil, water, gas, solids and cooling liquid (if not oil or water itself) separate from one another into separate phases such as water phase 38, oil phase 39, and gas phase 40 in the interior separator 37. During such separation operation, the solid fines will settle to the bottom of separator 37 as shown at 41. Gas is removed from separator 37 by way of conduit 42 as shown by arrow 43 after passing through a demisting means 44 to knock any retained liquid carried by the gas back into the interior of separator 37 so that essentially only gas such as hot air is removed by way of conduit 42. Impeller means 45 keeps settled solid fines 41 stirred and mixed with water so that a slurry of water and solids can be removed from the bottom of separator 37 by way of conduit 56 and pump 56' for return, at least in part, if desired, by way of conduit 57 as shown by arrow 58 for retreatment in dryer 20 of FIG. 3 or for other disposal by way of conduit 59 as shown by arrow 60.

The cooling liquid employed in spray chamber 31 can be water, oil (for example, an oil similar to or the same in composition to the oil present in the vapor stream in pipe 30), or other cooling liquid which will perform the function required of condensing the oil and water vapor and then separating from the oil and water into its own separate phase in separator 37. For sake of simiplicity, it is preferred, although not required, that the cooling liquid be either water or an oil which is the same or quite similar in composition and character to the oil vapor present in conduit 30.

Assuming for sake of explanation that the cooling liquid in FIG. 4 is water, the cooling water and condensed water from the water vapor in pipe 30 are collected in water phase 38 is the bottom of separator 37. Part of this water is withdrawn by way of conduit 61 and pump 62 either for removal from the process by way of conduit 63 or return, at least in part, to the process by way of conduit 64, or both. In the embodiment of FIG. 4, the water recycled in the process is passed to heat exchanger 65 for cooling and-after cooling is passed by way of conduit 66 back to manifold 34 for reuse as cooling liquid in spray chamber 31.

Heat exchanger 65 is supplied with cool liquid by way of conduit 67 and such liquid after coming into indirect heat exchange contact with the hot water in conduit 64 is removed from heat exchanger 65 by way of conduit 68 for disposal. Since this invention is to be carried out on an offshore drilling platform, water from the body of water in which the drilling platform is operating can be employed for the cooling water in conduit 67 as well as for the cooling liquid used in spray chamber 31. Oil is removed from oil phase 39 of separator 37 by way of conduit 70 and pump 71 for return by way of conduit 71 to the drilling operation for reuse as shown by arrow 73, for example, for use in making up an oil based drilling mud for use in the drilling operation itself.

Figure 5:
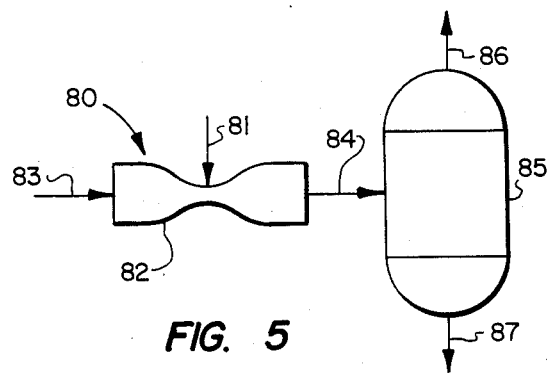
FIG. 5 shows a venturi scrubber that can be used in lieu of the spray chamber of FIG. 4 in the practice of this invention.

Other apparatus can be employed in lieu of spray chamber 31, for example, as shown in FIG. 5, a venturi scrubber 80 can be employed wherein the water and oil vapor mixture containing entrained solid fines from outlet conduit 23 of one or more dryers 20 of FIG. 3 can pass as shown by arrow 81 into venturi 82 while cooling liquid is supplied at the throat of the venturi as shown by arrow 83 to create a mixture of cooling liquid and vapor to cause condensation of the water and oil vapor. The resulting essentially liquid mixture passes as shown by arrow 84 to a separator device 85 which can be similar to separator 37 as shown in greater detail in FIG. 4, outlet conduits 86 and 87 of separator 85 corresponding respectively to conduits 42 and 56 of FIG. 4.

As noted before in FIG. 4, the solids containing oil and water vapors from dryer 20 are condensed by sprays of cooling liquid, such as cool seawater, using spray chamber 31, venturi scrubber 80 or other suitable device obvious to those skilled in the art and in this step, the latent heat (and some sensible heat) from the oil and water vapors is picked up by increasing the sensible heat of the cooling liquid. The resulting liquid mixture of cooling liquid, water, and oil naturally separates in the separator vessel, such as vessel 37 of FIG. 4, since oil is lighter than water and the phases are immiscible, immiscibility with both water and oil being one requirement for the cooling liquid employed in this invention if it is different from water or the oil already present. The levels of both the oil phase and the water phase in separator 37 are separately controlled and maintained in a conventional manner by well known liquid level sensing and valve means and by separate oil and water discharge pumps 62 and 71 working in conjunction with bottom flow discharge pump 56'.

By introducing the liquid mixture from chamber 31 and conduit 35 below the oil-water interface 90, the sedimentation rate of the entrained cuttings solids fines is increased by increasing the probability that the solid fines will be more water-wet than oil-wet since those fines will, by reason of being introduced below interface 90, not be required to settle downwardly through oil phase 39. The bulk of the water removed from separator 37 by way of conduit 61 can be returned through heat exchanger 65 to spray chamber 31 although it can be necessary to remove a draw-stream of water, as well as oil, since additional water and oil is continually introduced to the condensing system from the dryers by way of conduit 30. All of the latent and sensible heat removed from the thus treated dryer vapors can be rejected to a suitable heat sink such as the body of water surrounding the drilling platform by way of heat exchanger 65 without contamination of that body of water by contacting same with oily fluids.

If the water-solid slurry 41 at the bottom of separator 37 is adequately oil-free, this slurry can be intermittenly disposed of in an environmentally acceptable manner. If, however, there are found to be minute amounts of oil in this slurry 41, the slurry can be intermittenly fed back by way of conduit 57 to one or more dryers 20 for retreatment until the slurry 41 is essentially oil-free. The solids from the slurry 41 constituting only about one to about three weight percent of the solids fed to the dryer or dryers 20, allows this recycling process back to the dryer or dryers without requiring any significant degree of additional dryer capacity.

Of course, cooled recycled oil could be used as a cooling fluid as well as cool liquid water. Further, heat exchanger 65 could be eliminated and water such as seawater fed directly to manifold 34 for use as cooling liquid in spray chamber 31.

EXAMPLE

A mixture of drilling cuttings, salt water, and mineral oil is processed in the apparatus shown in FIGS. 3 and 4. The cuttings, water, oil mixture is heated and a first heat exchanger 20 to a temperature of about 220° after at least five minutes under autogamous pressure so that essentially all of the water in the mixture and about twenty-five percent of the oil present is vaporized and passed to spray chamber 31 by way of conduit 30.

The heated mixture of dry oil and cuttings from the first dryer 20 passes to a second heat exchanger similar to dryer 20 and therein is heated to a temperature of about 650° after at least five minutes until essentially all of the oil remaining with the cuttings is vaporized so that dry oil-free cuttings are recovered from the second dryer while the oil vapor is separately removed to spray chamber 31 by way of conduit 30.

In spray chamber 31, the mixture of vaporous oil and water is intimately mixed with salt water sprays, the salt water being at a temperature of about 50° F. and being supplied in an amount such that the resulting mixture of liquid water and liquid oil in conduit 35 is at a temperature of about 100° F. This liquid mixture is then allowed to sit in separator 37 until the oil separates from the water into two phases, 38 and 39, while hot air is collected above oil phase 39 for eventual venting from separator 37 by way of conduit 42. The liquefied mineral oil is then removed from separator 37 by way of conduit 70 and pump 71 as required, the same reasoning applying to a liquid water removal by way of conduit 61 and pump 62. Further, a slurry of settled drilling cuttings fines and water 41 is removed by way of conduit 56 and pump 56' for retreatment in one or more dryers and/or disposal as desired.

Reasonable variations and modifications are possible within the scope of this disclosure without departing from the spirit and scope of this invention.

I claim:

1. In drilling apparatus for drilling a wellbore in the earth wherein the drilling operation generates a substantial amount of a mixture of solid drilling cuttings, water and at least one hydrocarbonaceous oil, and said mixture is heated at least one time to vaporize essentially all said water and oil to produce essentially dry, oil-free cuttings and at least one stream composed of a mixture of vaporized water, oil and entrained solid fines, a system comprising condensing means for mixing said at least one stream of vaporized water, oil, and solid fines with a cooling liquid to condense said vaporized water and oil to the liquid state, and separator means for separating said water, oil and solid fines from one another, and for separately recovering each so that said separately recovered water and oil streams are essentially free of solid fines, said separator means comprising a separator vessel having an inlet conduit opening into a chamber in said vessel and at a point below a water-oil interface in said chamber when said water, oil and solid fines are being separated, separate outlet conduits for discharging separated water, oil and solid fines, respectively, from said vessel, means for conveying a slurry of water and solid fines from said vessel to dryer means for said mixture, and means for recirculating at least one of said separated water and oil to said condensing means for use as said cooling liquid.

2. In a method for recovering solids such as drill cuttings formed from a drilling operation and the like wherein the drlling operation generates a substantial amount of a mixture of solid drill cuttings, water and at least one hydrocarbonaceous oil, and dryer means is provided for receiving said mixture and said mixture is heated in said dryer means to vaporize essentially all said water and oil to produce an essentially dry, oil-free cuttings stream and to produce separate from said cuttings stream at least one stream composed of a mixture of vaporized water and oil and retained solid fines, the improvement comprising mixing said at least one stream of vaporized water, oil and solid fines with a cooling liquid to condense said vaporized water and oil to the liquid state, passing cooling liquid and condensed water and oil liquid to a separator vessel to be held therein until said oil and water separate from one another and said solid fines settle to the bottom of said vessel, separating said water, oil, and solid fines from one another, separately recovering each of said water, oil and solid fines so that said separately recovered water and oil streams are essentially free of said solid fines and conveying said solid fines from said separator vessel to said dryer means for entrainment in said mixture.

3. The method set forth in claim 2 including the step of:
mixing said solid fines separated in said separator vessel with water sufficiently to convey said solid fines as a slurry out of said separator vessel and to said dryer means.

4. In drilling apparatus for drilling a wellbore in the earth from a location in a body of water wherein the drilling operation generates a substantial amount of a mixture of solid drilling cuttings, water and at least one hydrocarbonaceous oil, and said mixture is heated at least one time to vaporize essentially all said water and oil to produce an essentially dry, oil-free cuttings stream acceptable for disposal in said body of water and separate from said cuttings stream at least one stream composed of a mixture of vaporized water and oil and retained solid fines, the improvement comprising condensing means for mixing said at least one stream of vaporized water, oil, and solid fines with a cooling liquid to mix with and condense said vaporized water and oil to the liquid state, means for separating said water, oil and solid fines from one another, means for separately recovering each so that said separately recovered water and oil streams are essentially free fo solid fines comprising a separator vessel having an interior chamber, an inlet conduit opening into said chamber and at a point below a water-oil interface in said chamber when said water, oil and solid fines are being separated, means for conveying a slurry of water and solid fines from said separator vessel to dryer means for heating with said mixture, and means for recirculating at least one of said separately recovered water and oil streams to said condensing means for use as said cooling liquid.

5. The apparatus of claim 4 wherein said condensing means is a spray chamber.

6. The apparatus of claim 4 wherein said condensing means is a venturi scrubber.

7. In a method for recovering solids such as drill cuttings formed from a drilling operation and the like wherein the drilling operation generates a substantial amount of a mixture of solid drill cuttings, water and at least one hydrocarbonaceous oil, and dryer means is provided for receiving said mixture and said mixture is heated in said dryer means to vaporize essentially all said water and oil to produce an essentially dry, oil-free cuttings stream and to produce separate from said cuttings stream at least one stream composed of a mixture of vaporized water and oil and retained solid fines, the improvement comprising mixing said at least one stream of vaporized water, oil and solid fines with a cooling liquid to condense said vaporized water and oil to the liquid state, passing cooling liquid and condensed water and oil liquid to a separator vessel, separating said water, oil, and solid fines from one another, separately recovering each of said water, oil and solid fines so that said separately recovered water and oil streams are essentially free of said solid fines and conveying said solid fines from said separator vessel to said dryer means for entrainment in said mixture.

8. Apparatus for recovering solids such as drill cuttings formed from a drilling operation and the like wherein the drilling operation generates a substantial amount of a mixture of solid drill cuttings, water and at least one hydrocarbonaceous oil, said apparatus comprising:
dryer means for receiving said mixture and for heating said mixture to vaporize essentially all said water and oil to produce an essentially dry, oil-free cuttings stream and to produce separate from said cuttings stream at least one stream composed of a mixture of vaporized water and oil and retained solid fines, means for mixing said at least one stream of vaporized water, oil and solid fines with a cooling liquid to condense said vaporized water and oil to the liquid state, a separator vessel in communication with said means for mixing for separating said water, oil, and solid fines from one another, means for separately recovering each of said water and oil so that said separately recovered water and oil streams are essentially free of said solid fines and means for conveying a slurry of at least one of said water and oil and said solid fines from said separator vessel to said dryer means for entrainment in said mixture.

* * * * *